Feb. 27, 1968   G. HOHWART ET AL   3,370,860
BACKING SCREW
Filed May 28, 1965
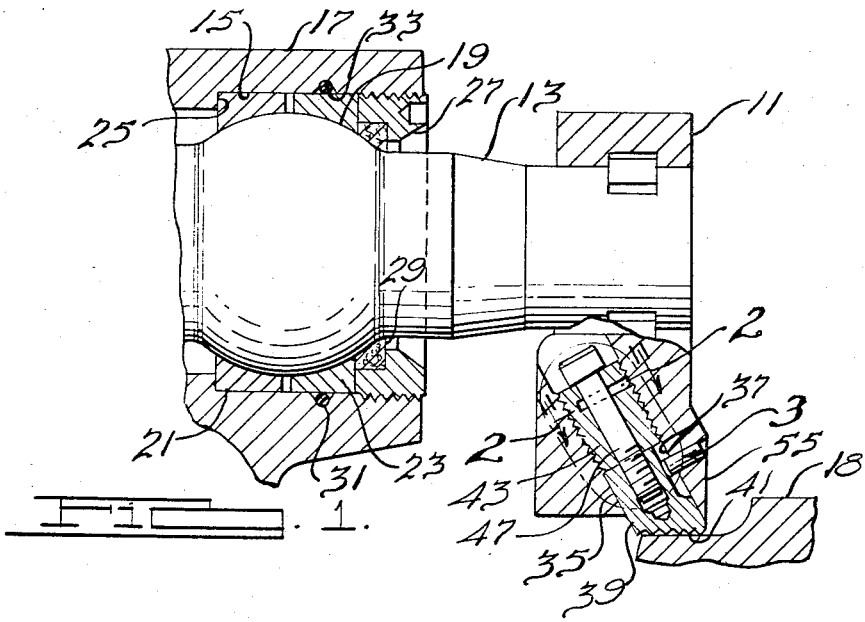
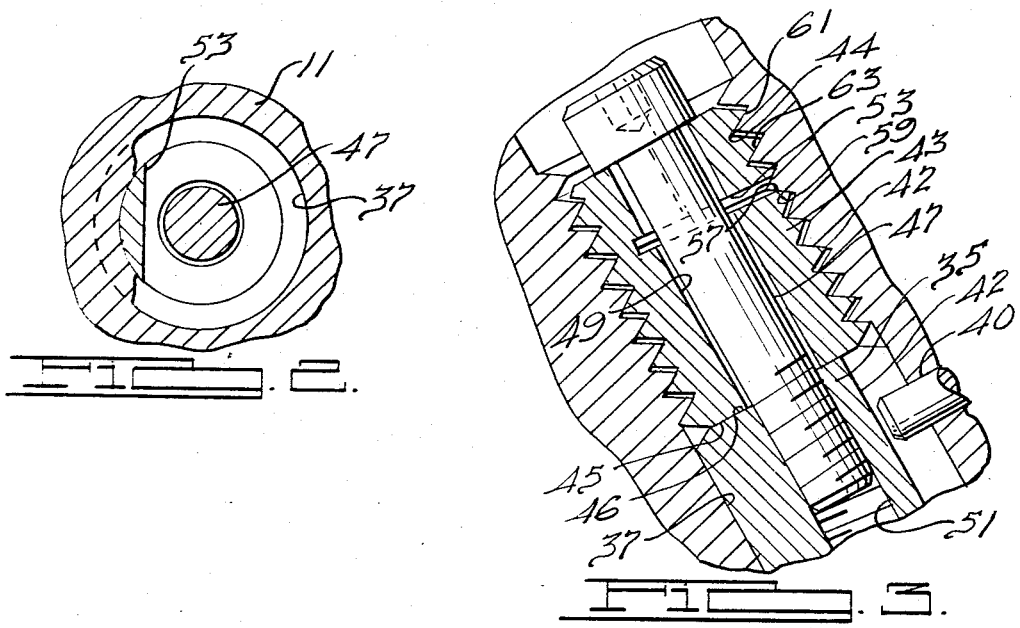
INVENTORS.
George Hohwart,
Paul Toth.
BY
Harness, Dickey & Pierce
ATTORNEYS.

United States Patent Office 3,370,860
Patented Feb. 27, 1968

3,370,860
BACKING SCREW
George Hohwart, Farmington, and Paul Toth, Allen Park, Mich., assignors to N. A. Woodworth Company, Ferndale, Mich., a corporation of Michigan
Filed May 28, 1965, Ser. No. 459,541
1 Claim. (Cl. 279—123)

ABSTRACT OF THE DISCLOSURE

This invention is a chuck jaw assembly having a backing screw behind the jaw insert that is uniquely constructed to provide solid back-up support for the insert and that is capable of sustaining the extremely high clamping pressure imposed on the jaw insert in use.

Specifically, the backing screw is provided with a transverse slot the open end of which is initially at least partially closed so that interference occurs between the external threads of the screw and the internal threads of the hole in which it is mounted. This interference tends to spread the parts of the screw at opposite sides of the slot. This spreading action in turn assures that all of the screw threads in front of the slot seat rearwardly against the internal threads and that the screw threads behind the slot seat forwardly against the internal threads. As a result, the rearwardly seating external threads are simply forced back against the internal threads with greater force under clamping pressure and the full force is distributed over the entire area of the engaging threads.

As a special feature, a fastening screw may be provided which extends through the backing screw and the transverse slot therein and into the jaw insert. When the fastening screw is tightened it pulls the insert back against the backing screw and prevents the insert from falling out of the hole. In addition, tightening of the fastening screw augments the frictional engagement normally established between the internal and external threads by the transverse slot.

---

This invention relates generally to element positioning screws and particularly to an improved adjustable self-locking backing screw.

The present invention is particularly useful in providing an adjustable support for an element within a body and is constructed to withstand severe forces tending to move the element against its support. One application in which this invention is especially advantageous is work-holding chucks wherein the chuck jaws are provided with removable inserts which establish the actual contact with the workpiece held thereby. These inserts may take many forms but generally are small rod-like pieces positioned within an elongated opening or hole in the chuck jaw. The outer end of these jaw inserts extends outwardly of the end of the jaw and is generally serrated or otherwise roughened to provide work gripping teeth. This type of construction is desirable since when the gripping teeth become worn or broken, only the relatively inexpensive inserts need be removed and replaced.

In use, the accuracy of the chuck depends upon how accurately the inserts are positioned within the chuck jaws. In addition, chuck accuracy and consistency require that the inserts be solidly held in a given position relative to the jaws since the forces generated on the inserts during workpiece clamping are often extremely high. In achieving these ends, it is decidedly advantageous that the jaw and jaw inserts expose a maximum amount of the workpiece surface to a finishing or other machine tool. Further, it is desirable that the chuck jaw inserts be adjustable through a range of positions within the chuck jaw in order to compensate for manufacturing inaccuracies in the inserts, jaws or other chuck components as well as to permit handling of a wide range of workpiece sizes and configurations.

The main objects, therefore, of the present invention are an adjustable, self-locking backing screw adapted to accurately position an element within a body and solidly retain the element in a given position against relatively high forces imposed thereon.

Further objects of this invention include a backing screw of the above character which permits controlled and accurate adjustment of the element through a range of positions and provides solid support throughout all positions.

Additional objects include a backing screw of the above character which is particularly adapted for use in positioning and solidly supporting removable chuck jaw inserts and which together with a chuck jaw exposes a maximum amount of workpiece surface during chucking.

Other objects of this invention are an adjustable, self-locking backing screw of the above character which is relatively inexpensive to manufacture, rugged in construction and reliable in use.

Additional objects and advantages of the present invention will become more apparent from a consideration of the following detailed description taken in conjunction with the drawings in which:

FIG. 1 is a fragmentary sectional view of a chuck jaw and carrier embodying the present invention.

FIG. 2 is an enlarged sectional view of FIG. 1 taken along the line 2—2 thereof;

FIG. 3 is an enlarged view of the portion of FIG. 1 within the enclosure 3 thereof.

Broadly described, the present invention includes a body provided with a removable element or insert and having a transversely slotted backing screw threaded into a hole behind the element. The outer end of the slot is closed sufficiently to tension the screw longitudinally during threading into the hole and cause the rear flanks of the backing screw threads on the side of the slot adjacent the insert to seat against the front flanks of the threads in the hole and to cause the front flanks of the backing screw threads on the other side of the slot to seat against the rear flanks of the hole threads. A fastening screw extends through the backing screw and is threaded into the element or insert to hold it against the backing screw and tends to compress the backing screw, thereby further loading the backing screw and hole thread flanks in the above manner.

Referring now specifically to the drawings, a chuck embodying the present invention is shown partially in FIG. 1. This chuck may be any conventional type having a plurality of radially movable jaws adapted to hold a workpiece in a predetermined position. One such chuck is disclosed in U.S. Patents Nos. 3,104,886 and 3,099,457, granted Sept. 24, 1963 and July 30, 1963, respectively, to the applicants in the present application and reference may be made thereto for a more detailed description of the construction and operation thereof. Suffice it here to say that his chuck includes a plurality of chuck jaws 11 (only one of which is shown), each carried by a rocker arm 13 pivoted or swiveled in an opening 15 in a housing 17 for movement from an open position where the jaws 11 are spaced from a workpiece 18 to a closed position where the jaws 11 engage and hold the workpiece in a predetermined position. The swivel mounting for the rocker arms 13, while not a part of this invention, may be a ball and socket type joint which includes a ball 19 formed on the rocker arm 13 intermediate its ends and a socket formed by two spaced bearing races 21 and 23. As shown in FIG. 1, the bearing races 21 and 23 are closely received within the housing opening 15 with the race 21 positioned to abut a shoulder 25 formed therein. A retainer 27 is threaded into the outer end of the opening 15 to bias the bearing race 23 and the rocker arm 13 toward the race 21 to compensate for small manufacturing tolerances in the ball and races. In addition, a packing or seal 29 is held against the rocker arm ball 19 to keep the ball and socket joint free from dirt, chips and other foreign matter. A conventional O-ring 31 is positioned within a groove 33 in the opening 15 and engages the race 23 to prevent fluid leakage therepast.

The jaws 11 are carried by the rocker arms 13 adjacent their outer ends and it is to be understood that the particular configuration and size of these jaws depends upon the configuration and size of the workpiece to be held thereby. In addition, as described in the U.S. patents listed above, the jaws 11 may be carried upon the outer ends of the rocker arms 13 for limited pivotal or rocking movement about the longitudinal axis thereof to compensate for workpiece irregularities and grip the workpiece with equal pressure.

As seen in FIG. 1, each of the jaws 11 is provided with one or more jaw inserts 35 (only one of which is shown) which establish the actual contact with the workpiece 18 during the chucking sequence. Preferably, these inserts are small rod-like pieces removably positioned within an elongated opening or hole 37 in the chuck jaw 11. The outer end 39 of the inserts 35 extends outwardly of the end of its jaw 11 and is generally serrated or otherwise roughened to provide workpiece gripping teeth 41. To insure proper angular positioning of the work gripping face of the insert 35, a dowel pin 40 extends inwardly of the hole 37 and is received in a longitudinal slot or keyway 42 in the insert 35.

As described above, these jaw inserts 35 are desirably removable from the chuck jaws 11 and replaceable when the gripping teeth 41 become worn or broken. However, a long-standing problem exists in this as well as other fields because of the extremely high chucking pressures often encountered and the fact that accuracy and consistency of the operation performed on a workpiece depend upon accurate insert positioning with the jaws. Thus, the mounting for the jaw inserts must be such as to accurately position them within the jaws and to be able to withstand extremely high chucking pressures in maintaining this positioning.

The jaw insert mounting of this invention includes a backing screw 43 provided with helical screw threads 42 engaging complementary helical screw threads 44 formed in the hole 37 behind the jaw insert 35. The backing screw 43 has an end face 45 positioned to abut an end face 46 of the insert 35. A fastening screw 47 extends freely through an opening 49 in the backing screw 43 and is threadedly received in an opening 51 in the insert 35 to removably hold the backing screw and insert together and hold the insert within the hole 37. The end of the opening 49 adjacent the head of the fastening screw 47 may be hexagonal or otherwise suitably formed to receive a wrench to facilitate inserting and removing.

In order that the jaw insert 35 be accurately held within the hole 37, it is necessary that the backing screw 43 be able to withstand the high chucking pressures and not move axially within the hole 37. In practice, the external threads 42 of the backing screw 43 seldom fit the internal threads 44 of the jaw 11 exactly and the resulting clearances between these threads permit some axial shifting of the backing screw 43 under chucking pressure. Thus, the backing screw 43 can work back and forth to some extent becoming loose and damaging the threads of either the backing screw or hole, or both. Various types of locking constructions for these backing screws have been tried, including those having a radial set screw locking the backing screw from the side through a small, preferably soft, insert, such as, for example, brass, positioned therebetween. However, this was not entirely satisfactory since the amount of surface contact between the insert and backing screw threads was not sufficient to withstand high chucking pressures.

According to the present invention, the backing screw 43 has a novel construction requiring no special connectors to provide a solid backing for the jaw inserts 35. As seen perhaps best in FIGS. 2 and 3, the screw 43 has a generally transverse slot 53 formed therein at an intermediate portion thereof. Though not critical, the slot 53 preferably is spaced further from the end face 45 than from the other face, thereby providing a relatively large number of uninterrupted threads between the slot 53 and the end face 45.

Before being threaded into the hole 37, the backing screw 43 is axially compressed as by squeezing to close or bring the walls of the slot 53 somewhat closer together. Thereafter, upon threading the screw 43 into the hole 37 to engage threads at both sides of the slot 53, interference is encountered between the threads 42 and 44 tending to spread the parts of the backing screw 43 at opposite sides of the slot. Preferably, the slot 53 lies generally on the helix angle of the backing screw threads 42 so as not to cut across the threads and expose any edges thereof which might damage the screw threads 44 in the hole 37 when the backing screw 43 is threaded therein.

Specifically, the backing screw threads 42 on the slot side of the screw 43 between the slot 53 and the end face 45 have their rear flanks, shown at 57, seated against the hole thread front flanks, shown at 59. The backing screw threads 42 on the slot side of the screw 43 on the other or rearward side of the slot 53 have their front flanks, shown at 61, seated against the hole thread rear flanks, shown at 63. The backing screw threads 42 opposite the slot 53 all have their rear flanks seated against the hole thread front flanks. The seating of those backing screw threads 42 on the slot side of the screw 43 between the slot 53 and the end face 45 and all the backing screw threads 42 opposite the slot 53 against the threads 44 in the manner described above assures that the backing screw 43 is free from play and will not move axially within the hole 37 under work clamping force and therefore provides a solid backing for the jaw insert. The seating of the backing screw threads 42 on the slot side of the screw 43 to the rear of the slot 53 against the internal threads in the jaw 11 in a direction toward the jaw insert assures that the first-mentioned threads 42 remain properly seated as described above at all times. Also, it should be noted that the fastening screw 47, when threaded into the jaw insert 35, further squeezes the backing screw 43 axially and serves to increase the above-mentioned desired seating action between the screw threads 42 of the backing screw and those in the hole 37.

When it is desired to remove and replace the jaw insert 35, the fastening screw 47 simply is loosened and the jaw insert 35 removed from the hole 37. Thereafter, a new insert 35 is inserted and the fastening screw tightened.

By forming the backing screw 43 as described above, thread interference and the positive insert backing are accomplished without damaging any of the threads since the backing screw 43 is tensioned during threading tending to open the slot 53. In this way, the backing screw 43 can be positioned at a variety of axial positions within the hole 37 thereby providing a range of adjustment for the jaw insert 35. Also, since no thread damage occurs, the backing screw 43 can be removed and reused or replaced, if desired.

Another feature of this invention is the particular jaw and jaw insert construction which permits a maximum amount of the workpieces held thereby to be machined or otherwise treated. Thus, as seen in FIG. 1, the jaw insert 35 is located within the jaw 11 so that the work gripping end face 41 extends to a position at least flush with and preferably slightly beyond the jaw front face 55. In this way, the workpiece 18 can be machined right up to the jaw inserts 35 with no interference by the jaw 11. Also, the entire jaw insert 35 with the exception of the relatively small extended end 39 is rigidly supported within the hole 37 providing maximum support therefor and virtually eliminating any danger of breaking.

It will be apparent that by the present invention there has been provided an improved, highly effective and adjustable self-locking backing screw particularly adapted for supporting and retaining removable chuck jaw inserts and which accurately and positively locates the inserts or other elements within the jaw or body and which permits workpiece machining close to the jaws.

While a preferred embodiment of the present invention has been illustrated and described in detail above, various additions, substitutions, modifications and omissions may be made thereto without departing from the spirit of the invention as encompassed by the appended claim.

What is claimed is:
1. The combination of
a chuck jaw
   having an opening in one face thereof provided with an internally threaded rear portion;
a jaw insert
   mounted in and relatively snugly fitting the front portion of said hole;
a backing screw
   in the rear portion of the hole having external threads
   engaging the internal threads of said opening and an end face
   behind and butting against said insert,
   said backing screw having a transverse slot intermediate the ends thereof, the outer end of said slot being closed sufficiently to provide interference between the external threads of the backing screw and the internal threads of said hole tending to open said slot and to seat the rear flanks of the backing screw threads forwardly of the slot against the front flanks of the hole threads and to seat the front flanks of the backing screw threads rearwardly of the slot against the rear flanks of the hole threads, whereby said screw provides a solid backing for said insert and high clamping pressure occurring in use is distributed over the entire area of its forward screw threads; and
a fastening screw
   extending axially forwardly through said backing screw and said transverse slot and threadedly received in said jaw insert,
   said fastening screw being normally tightened to hold said jaw insert against said backing screw and to augment the frictional engagement normally established by said transverse slot between the external threads of the backing screw and the internal hole threads.

References Cited

UNITED STATES PATENTS

| | | | |
|---|---|---|---|
| 1,849,240 | 3/1932 | McCrudden | 151—14 |
| 2,427,560 | 9/1947 | Johnson | 151—14 |
| 2,714,514 | 8/1955 | Hohwart | 279—1 |
| 3,054,621 | 9/1962 | Buck | 279—123 |
| 3,151,862 | 10/1964 | Nicosia | 279—123 X |

FOREIGN PATENTS

| | | |
|---|---|---|
| 596,470 | 4/1925 | France. |

ROBERT C. RIORDON, *Primary Examiner.*